United States Patent Office 3,232,639
Patented Feb. 1, 1966

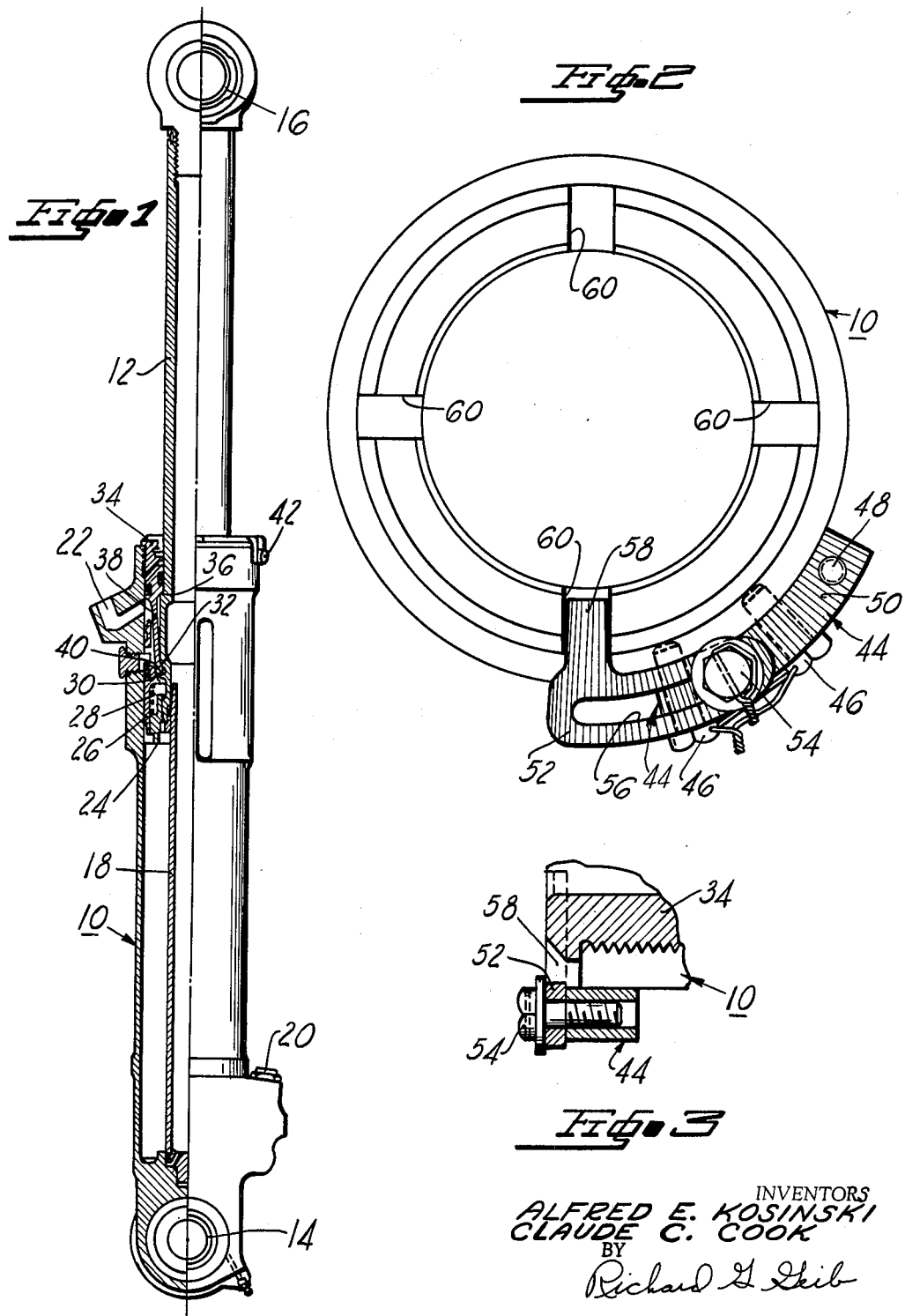

3,232,639
ADJUSTING AND LOCKING MEANS
FOR A NUT
Alfred E. Kosinski and Claude C. Cook, South Bend, Ind., assignors to The Bendix Corporation, Aerospace Division, South Bend, Ind., a corporation of Delaware
Filed Oct. 3, 1963, Ser. No. 313,654
3 Claims. (Cl. 285—81)

This invention relates to a unique method of restraining rotation for movement of a nut or similar type fastener, which means has infinite adjustments through 360° rotation.

In telescoping devices such as hydraulic actuators, as well as simple fastening devices, it has long been a problem to eliminate the effect of thread slop between the male and female connecting elements. As will be appreciated by those skilled in the art to which this invention relates, the effect of thread slop is to reduce the load carrying ability of the connection in that the loads will cause one or the other of the fastening elements or members to move with respect to the other and thereby create localized loading on the threads that will eventually strip the threaded connection. In order to prevent this, in the past periodic inspections and retightening of the connections has been necessitated. It is therefore a principal object of this invention to eliminate the need for these inspections and retightening by providing a lock means for a threaded connection which will permit the fastening to be tightened in such a fashion as to eliminate thread slop and to thereafter hold the fastener in such a condition.

It is also an object of this invention to provide a locking means having infinitesimal increments of adjustment to allow locking means to align itself with the connecting elements rather than having the connecting elements align themselves with the locking means, as has been done in the past.

Furthermore, it is an object of this invention to provide a hydraulic actuator packing nut with a locking means that will allow the packing nut to be completely tightened so that there is face-to-face contact throughout the thread depth of the packing nut and to thereafter hold such contact until it is time to disassemble the actuator whereupon the locking means may be removed.

Further and favorable advantages and objects of our invention will appear to those skilled in the art to which our invention relates from the following description of the appended drawings in which:

FIGURE 1 shows a hydraulic actuator provided with a locking means for the packing nut thereof in accordance with principals of our invention;

FIGURE 2 shows a plan view of the hydraulic actuator of FIGURE 1 provided with a locking means in accordance with the principals of our invention; and FIGURE 3 is a cross section of a cut-away portion of the hydraulic actuator of FIGURE 1 showing a side view of our locking means.

In more detail and with particular reference to FIGURE 1, there is shown a hydraulic actuator having a power cylinder 10 and a telescoping force transmitting member 12. As seen, the power cylinder 10 is arranged to be affixed to the structure by the means of a trunnion fitting 14, and the force transmitting member or piston rod 12 is similarly constructed to have a trunnion 16 for connection with surrounding structure. Within the cylinder 10 we have mounted a guide tube 18 that is arranged to cooperate with the inner walls of the force transmitting member 12, as shown. In addition, the cylinder 10 is provided with a lower fluid inlet 20 and an upper fluid inlet 22.

The force transmitting member 12 is constructed with a piston 24 of an annular design which includes a locking sleeve 26 biased by a spring 28 to rest against an annular shoulder 30 formed on the lower end of the force transmitting member 12. Behind the shoulder 30 the force transmitting member 12 is formed with a groove having an angled shoulder 32 for purposes to be hereinafter explained.

We have also provided a packing nut 34 adapted to be threaded into the inlet of the power cylinder 10 to form an upper guide bearing and seal connecting the force transmitting member 12 of the cylinder 10. As seen in FIGURE 1, the force transmitting member 12 is fully extended so that a shoulder 36 abuts a projection of the packing nut 34. In order to hold the force transmitting member in this position the packing nut is provided with a plurality of spring fingers 38 that are of tapered construction and terminate in a bulbous portion 40 having angled surfaces that cooperate with the groove behind the shoulder 30 and with the angled shoulder 40 of the force transmitting member 12. The spring biased sleeve 26 is adapted to fit over the locking fingers 38, as seen in FIGURE 1, when the actuator is in its fully extended position to thereby insure the locking of the actuator. The angle of the shoulder 32 and the bulbous portion 40 are chosen to provide the maximum load bearing contact surface. Such an angle may be of the order of 45° whereby the force vectors through the part may be easily directed from the force transmitting member 12 to the power cylinder 10 via the packing nut 34.

Thus, it is imperative that the packing nut 34 be tightly threaded to the power cylinder 10 so that the threads are in intimate contact with the cylinder throughout the depth thereof. If the packing nut 34 is loose within the cylinder the thread-slop created thereby will allow for the sudden impacting of the threads and thereby strip the connection as has occurred in the past. Therefore, the packing nut 34 is tightened down to completely engage the threads and thereafter held in place by a locking device 42. Such a locking device must be one which will allow for a multitude of positions of the packing nut with respect to the cylinder 10.

Therefore, we have constructed a segment 44 (see FIGURE 2) that is bolted to the power cylinder 10 as by the bolts 46. The segment 44 is arcuate in nature and conforms to the contour of the cylinder 10. However, if other contours were desired, there is no reason why our segment 44 could not be adapted thereto. This segment 44 is provided at each end with threaded holes 48 and along the upper surface with serrations 50. An adjustment plate 52 serrated on both its upper and lower surfaces is then connected to the segment or retaining plate 44 by a bolt 54 that passes through a slot 56 in the adjustment plate 52. The adjustment plate 52 is provided with a locking pawl or projection 58 that is adapted to cooperate with the packing nut 34 as by projection into cut-away 60 thereof. Thus, the adjustment plate and the retainer plate have an infinite number of incremental adjustments available, i.e., the adjustment ring could be bolted in any quadrant of the above parts you desire to lock, then with the adjustment plate, as shown in FIGURE 2, you have 30° adjustment from the position shown. By removing the locking bolt and removing the adjustment plate to the next bolt hole you have another 30° adjustment. For additional 30° adjustment the plate is removed, turned over and bolted in the desired position by using the most convenient bolt hole.

If desired, the packing nut 34 may be of a castled construction having a plurality of slots of a greater number than that shown by FIGURE 2, or, if desired, the packing nut 34 may be appropriately drilled about the periphery to receive the projection 58 of the adjustment plate 52.

It is to be understood that the above description of the appended drawings is but one preferred form of our invention and that the true scope of our contribution to the art is found in the appended claims.

We claim:

1. In a fluid actuator having a power cylinder and a force transmitting member with a packing nut operatively connecting said cylinder and said member, a locking means for said packing nut to hold said nut in positive contact with said cylinder such that loading of said nut as by said force transmitting member will not strip the connection between said cylinder and said nut, said locking means comprising:
    a retainer plate connected to said cylinder, said retainer plate having an upper, serrated surface;
    an adjustment plate having serrated upper and lower surfaces with a slot therealong, said adjustment plate having a means to engage said packing nut and hold it from movement; and
    a means to attach said retainer plate and said adjustment plate through the slot of said adjustment plate to allow variable, incremental positioning of said means engaging said packing nut.

2. In a fluid actuator having a power cylinder and a force transmitting member telescopically arranged in said power cylinder with a packing nut closing said cylinder about said member which packing nut carries locking fingers to secure the actuator in an extended position, the improvement of a locking means for holding said packing nut in complete load bearing contact with said cylinder, which locking means comprises:
    an arcuate segment connected to said power cylinder, said arcuate segment being serrated on one surface thereof and connection means at each end thereof;
    a locking pawl having one leg adapted to grip said packing nut with another arcuate leg serrated on its upper and lower surfaces to match the serrated surface of said arcuate segment, said arcuate leg also having an arcuate slot through said serrated surfaces; and
    means to join said locking pawl and said arcuate segment through said slot of said arcuate leg to allow said leg adapted to grip said packing nut to be operative through a wide range of positions of said packing nut.

3. A fluid actuator comprising:
    a power cylinder;
    a force transmitting member telescopically arranged in said power cylinder;
    a packing nut threaded into said cylinder about said force transmitting member, which packing nut is provided with locking figures to secure said force transmitting member in its extended position from said power cylinder;
    an arcuate segment connected to said power cylinder, said arcuate segment being serrated on one surface thereof and provided with connecting means at each end of said segment;
    a locking pawl having one leg adapted to grip said packing nut with another arcuate leg serrated on its upper and lower surfaces to match the serrated surface of said arcuate segment, said arcuate leg of said locking pawl also having an arcuate slot through said serrated surfaces; and
    means to join said locking pawl and said arcuate segment through said slot of said arcuate leg to allow said leg adapted to grip said packing nut to be operative to a wide range of incremental positions of said packing nut.

References Cited by the Examiner
UNITED STATES PATENTS

| | | | |
|---|---|---|---|
| 1,366,232 | 1/1921 | Wisdom | 151—5 |
| 1,736,818 | 11/1929 | Aumack | 285—81 |
| 2,468,511 | 4/1949 | Pilch | 92—165 |
| 2,499,981 | 3/1950 | Strobel | 287—64 X |
| 2,728,895 | 12/1955 | Quackenbush et al. | 285—81 X |

CARL W. TOMLIN, *Primary Examiner.*